(12) United States Patent
Etoh et al.

(10) Patent No.: US 8,351,162 B2
(45) Date of Patent: Jan. 8, 2013

(54) MAGNETIC HEAD WITH ELECTRO LAPPING GUIDE

(75) Inventors: Kimitoshi Etoh, Kanagawa (JP); Hisashi Kimura, Kanagawa (JP); Isao Nunokawa, Kanagawa (JP); Tomohiro Okada, Kanagawa (JP)

(73) Assignee: HGST Netherlands BV, Amsterdam (NL)

( * ) Notice: Subject to any disclaimer, the term of this patent is extended or adjusted under 35 U.S.C. 154(b) by 163 days.

(21) Appl. No.: 11/192,532

(22) Filed: Jul. 29, 2005

(65) Prior Publication Data

US 2006/0028770 A1 Feb. 9, 2006

(30) Foreign Application Priority Data

Aug. 3, 2004 (JP) ................................ 2004-226635

(51) Int. Cl.
*G11B 5/33* (2006.01)
*G11B 5/147* (2006.01)
(52) U.S. Cl. ...................................... 360/317; 360/121
(58) Field of Classification Search .................. 360/316, 360/317, 121; 451/5, 28, 29, 41
See application file for complete search history.

(56) References Cited

U.S. PATENT DOCUMENTS

| | | | | |
|---|---|---|---|---|
| 4,670,732 A | * | 6/1987 | Church | 338/32 R |
| 4,689,877 A | * | 9/1987 | Church | 29/603.1 |
| 4,914,868 A | * | 4/1990 | Church et al. | 451/5 |
| 5,175,938 A | * | 1/1993 | Smith | 33/567 |
| 5,210,667 A | * | 5/1993 | Zammit | 360/316 |
| 5,588,199 A | * | 12/1996 | Krounbi et al. | 29/603.1 |
| 5,655,475 A | * | 8/1997 | Crandell et al. | 116/201 |
| 5,678,086 A | * | 10/1997 | Gandola et al. | 396/319 |
| 5,703,740 A | * | 12/1997 | Cohen et al. | 360/125.35 |
| 5,742,995 A | * | 4/1998 | Amin et al. | 29/603.1 |
| 5,749,769 A | * | 5/1998 | Church et al. | 451/5 |
| 5,772,493 A | * | 6/1998 | Rottmayer et al. | 451/5 |
| 5,997,381 A | * | 12/1999 | Dee et al. | 451/5 |
| 6,027,397 A | * | 2/2000 | Church et al. | 451/1 |
| 6,193,584 B1 | * | 2/2001 | Rudy et al. | 451/5 |
| 6,347,983 B1 | * | 2/2002 | Hao et al. | 451/57 |
| 6,728,067 B2 | * | 4/2004 | Crawforth et al. | 360/234.3 |
| 6,758,722 B2 | * | 7/2004 | Zhu | 451/5 |
| 6,935,923 B2 | * | 8/2005 | Burbank et al. | 451/5 |
| 6,950,289 B2 | * | 9/2005 | Lam et al. | 360/316 |
| 6,982,042 B2 | * | 1/2006 | Church et al. | 216/22 |
| 7,016,143 B2 | * | 3/2006 | Kirschenbaum et al. | 360/77.12 |
| 7,062,838 B2 | * | 6/2006 | Ding et al. | 29/603.12 |
| 7,116,519 B2 | * | 10/2006 | Koeppe et al. | 360/129 |
| 7,119,990 B2 | * | 10/2006 | Bajorek et al. | 360/128 |
| 7,206,172 B2 | * | 4/2007 | Ding et al. | 360/316 |

(Continued)

FOREIGN PATENT DOCUMENTS

JP 02-095572 4/1990

(Continued)

*Primary Examiner* — Brian Miller
(74) *Attorney, Agent, or Firm* — Daphne L. Burton; Burton IP Law Group

(57) ABSTRACT

Embodiments of the invention reduce the throat height of a single pole type head with high accuracy. In one embodiment, a head with an electro lapping guide for controlling a write head's throat height during air bearing surface processing is made. Air bearing surface processing is performed using the electro lapping guide. For a read head, processing is performed using the read head itself or an electro lapping guide for the read head so that both the throat height of write head and the element height of read head are controlled.

8 Claims, 14 Drawing Sheets

U.S. PATENT DOCUMENTS

| | | | |
|---|---|---|---|
| 7,245,459 B2 * | 7/2007 | Cyrille et al. | 360/316 |
| 7,290,325 B2 * | 11/2007 | Wu | 29/603.16 |
| 7,333,300 B2 * | 2/2008 | Church et al. | 360/313 |
| 7,360,296 B2 * | 4/2008 | Cyrille et al. | 29/603.12 |
| 7,369,361 B2 * | 5/2008 | Sasaki et al. | 360/125.01 |
| 7,469,465 B2 * | 12/2008 | Ding et al. | 29/603.12 |
| 2002/0173227 A1 * | 11/2002 | Lam et al. | 451/5 |
| 2002/0176214 A1 | 11/2002 | Shukh et al. | |
| 2003/0020467 A1 * | 1/2003 | Kasahara et al. | 324/207.21 |
| 2005/0063101 A1 * | 3/2005 | Church et al. | 360/313 |
| 2005/0070206 A1 * | 3/2005 | Kasiraj et al. | 451/5 |
| 2005/0128638 A1 * | 6/2005 | Koeppe et al. | 360/125 |
| 2005/0164607 A1 * | 7/2005 | Bajorek | 451/5 |
| 2006/0028770 A1 * | 2/2006 | Etoh et al. | 360/313 |
| 2008/0144215 A1 * | 6/2008 | Hsiao et al. | 360/119.04 |

FOREIGN PATENT DOCUMENTS

| | | |
|---|---|---|
| JP | 10-172115 | 6/1998 |
| JP | 2000-067408 A | 3/2000 |
| JP | 2000-137905 | 5/2000 |
| JP | 2001-198806 | 7/2001 |
| JP | 2002-100005 | 4/2002 |
| JP | 2002-197615 | 7/2002 |
| JP | 2002-298309 | 10/2002 |
| JP | 2005-317069 | 11/2005 |

* cited by examiner (a)

(b)

Fig.12-2
(e) 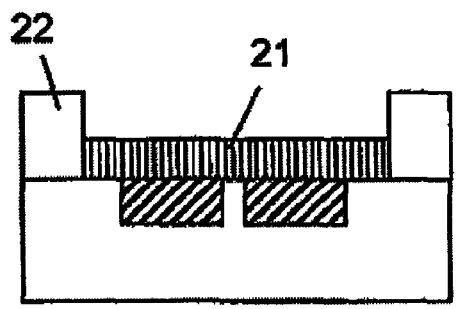 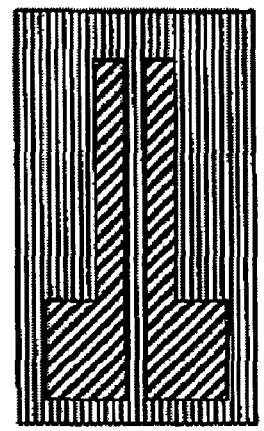
(f) 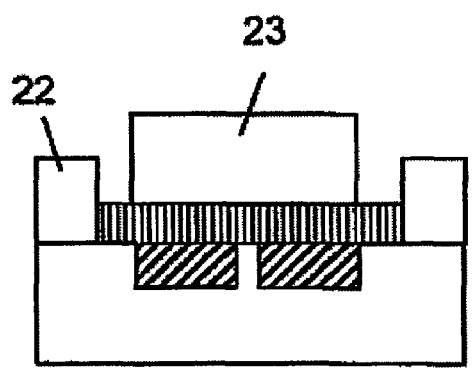 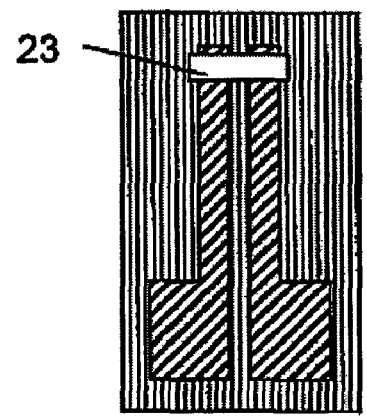
(g) 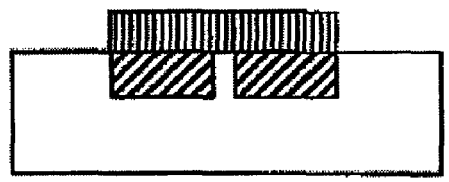 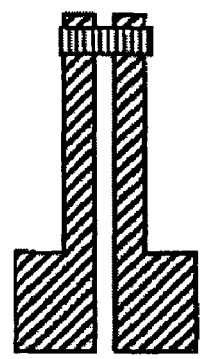

MAGNETIC HEAD WITH ELECTRO LAPPING GUIDE

CROSS-REFERENCES TO RELATED APPLICATIONS

This application claims priority from Japanese Patent Application No. JP2004-226635, filed Aug. 3, 2004, the entire disclosure of which is incorporated herein by reference.

BACKGROUND OF THE INVENTION

The present invention relates to a magnetic head which is used for writing to, and reading from, a magnetic recording medium, and a method of manufacturing the same.

In a hard disk drive, data on a recording medium is read or written by a magnetic head. In order to increase the magnetic disk's recording capacity per unit area, a higher areal density is needed. However, the existing longitudinal recording method has a problem that as the recorded bit length decreases, it becomes difficult to increase the areal density due to thermal fluctuation in medium magnetization. A solution to this problem is a perpendicular recording method whereby magnetization signals are recorded in a direction perpendicular to the medium. In the perpendicular recording method, the following types of read head may be used: a GMR head (Giant magnetoresistive head), TMR head (Tunneling giant magnetoresistive head) which provides higher reproduction output, and a CPP (Current perpendicular to the plane) type GMR head in which current flows perpendicularly to the film surface.

In the perpendicular recording method, in order to increase the areal density, the track density and the linear density must be improved as well. In order to improve the linear density, the write head's field gradient must be improved. One method of improving the field gradient is to use a double-layered recording medium having a soft under layer as the lower layer and use, as a write head, a single pole type head which has a main pole and a return pole. However, in order to achieve a high areal density of 200 Gb/in$^2$, the field intensity of the write head must be improved.

Methods of increasing the field intensity include: (1) increasing the cross-sectional area of the air bearing surface of the main pole; and (2) reducing the throat height. The cross-sectional area of the main pole is the product of the track width and the main pole height. The track width must be decreased in order to achieve a high areal density. As for the main pole height, a problem inherent in perpendicular recording might arise that if there is a skew angle in the head, data is written with a side face of the main pole. For this reason, the height is limited to the same level as the track width. On the other hand, there is no limitation to decreasing the throat height. However, because the throat height depends on alignment accuracy on a wafer and air bearing surface processing accuracy, it is difficult not only to reduce the throat height but also to achieve a high accuracy. The throat height which is now needed is approximately 300 nm or less and a processing accuracy of ±50 nm is needed.

The air bearing surface of a head is processed using an ELG (Electro Lapping Guide) element as a processing detection pattern. For example, JP-A No. 67408/2000 discloses a method which uses two ELGs.

BRIEF SUMMARY OF THE INVENTION

The above document discloses a manufacturing process of a magnetic head for conventional longitudinal recording in which a first and a second ELG (Electro Lapping Guide) are provided and the second ELG has the same shape as a read head. However, the above document refers to a method of controlling the element height of read head with high accuracy wherein the ELGs are only located on the read head side.

As mentioned above, the throat height of the perpendicular recording head must be reduced in order to increase the field intensity. However, the alignment accuracy in a wafer manufacturing process is approximately ±100 nm and furthermore an air bearing surface processing accuracy of ±50 nm is superimposed on this, so it is difficult to achieve the required perpendicular head throat height accuracy, ±50 nm.

Therefore, a feature of the present invention is to provide a manufacturing method whereby the throat height of the perpendicular recording head is reduced with high accuracy and provide a magnetic head for perpendicular recording with a throat height reduced with high accuracy.

FIG. 1 shows the relation between the magnetic field intensity of a main pole of a perpendicular recording head (single pole type head) and throat height. Throat height here means length H from the air bearing surface to the point (flare point) at which the width of the track width portion of the main pole begins to widen. It can be understood from the figure that the throat height must be reduced in order to obtain a larger magnetic field. Since the alignment accuracy in the existing wafer manufacturing process is ±100 nm or so and furthermore an air bearing surface processing accuracy of ±50 nm is superimposed on this, the resulting throat height processing accuracy will be ±112 nm or so. On the other hand, the required throat height accuracy is ±50 nm or less and therefore the required throat height processing accuracy has not been achieved yet. On the other hand, for the sensor height of a read head which is processed using ELGs, the processing accuracy is controlled to ±50 nm or less. This means that it is possible to achieve the required throat height processing accuracy using ELGs.

There are two methods of processing the head air bearing surface: one method is that a bar cut from a wafer is processed to finish the air bearing surface, and the other is that a single slider cut from a bar is processed to finish the air bearing surface.

In the method in which a bar is processed, an electro lapping guide may be placed between head elements. In this case, a head element may be inserted between two or more electro lapping guides as in conventional head processing methods. On the other hand, in the method in which the air bearing surface of a single slider is processed, an electro lapping guide for air bearing surface processing is inserted into a slider (head element).

Another advantage of this method is that throat height is guaranteed because processing of the throat height of write head is done using electro lapping guides for air bearing surface processing. Inspection of a read head after air bearing surface processing can be done by measuring, for example, a transfer curve for a GMR head (measurement of GMR head output under a magnetic field) and the head as a single unit is thereby guaranteed. In the case of a write head, write/read characteristics must be evaluated using a medium. When the method in the present invention is employed, throat height is guaranteed with electro lapping guides for air bearing surface processing, so the read head can be evaluated, for example, by evaluation of transfer curves.

A magnetic head according to an embodiment of the present invention includes a read head with a magnetoresistive element and a write head with a main pole and a return pole (single pole type head), and has an electro lapping guide for air bearing surface processing for exclusive use with the write head. In addition to the electro lapping guide for air bearing surface processing for exclusive use with the write head, it may have an electro lapping guide for air bearing surface processing for exclusive use with the read head. Air bearing surface processing may be done using both the electro lapping guide for air bearing surface processing for exclusive use with the write head and the electro lapping guide for air bearing surface processing for exclusive use with the read head. Also, the read element (magnetoresistive element) itself may be used to monitor processing for the read head. It is more advantageous in terms of accuracy that for the electro lapping guide for air bearing surface processing for exclusive use with the write head, a photoresist pattern is made at the same time when a photoresist pattern for the main pole is made.

In a magnetic head according to another embodiment of the present invention, a perpendicular recording magnetic head with a main pole, a return pole and a shield provided in the vicinity of the main pole may have an electro lapping guide for air bearing surface processing for which a photoresist pattern is made at the same time when a photoresist pattern for the shield in the vicinity of the main pole is made and may further have an electro lapping guide for air bearing surface processing for exclusive use with the read head. Air bearing surface processing may be done using both the electro lapping guide for air bearing surface processing for which a photoresist pattern is made at the same time when a photoresist pattern for the shield in the vicinity of the main pole is made, and the electro lapping guide for air bearing surface processing for exclusive use with the read head. Alternatively, the read element itself may be used to monitor processing for the read head.

According to the present invention, throat height control can be done with high accuracy. When processing is done while the read head ELG or the resistance of the read head itself is being monitored, both the element height of read head and the throat height of write head can be optimized. When a shield (trailing shield, etc.) is located in the vicinity of the main pole, the thickness from the air bearing surface of the trailing shield can be controlled if an electro lapping guide for air bearing surface processing is provided similarly.

BRIEF DESCRIPTION OF THE DRAWINGS

FIG. 12-1 and FIG. 12-2 schematically show the process of making an electro lapping guide for a write head according to an embodiment of the present invention.

FIG. 15-1 and FIG. 15-2 are schematic views showing the process of making an electro lapping guide for a write head in a head with a head with a trailing shield and a side shield according to an embodiment of the present invention.

DETAILED DESCRIPTION OF THE INVENTION

Figure 1:
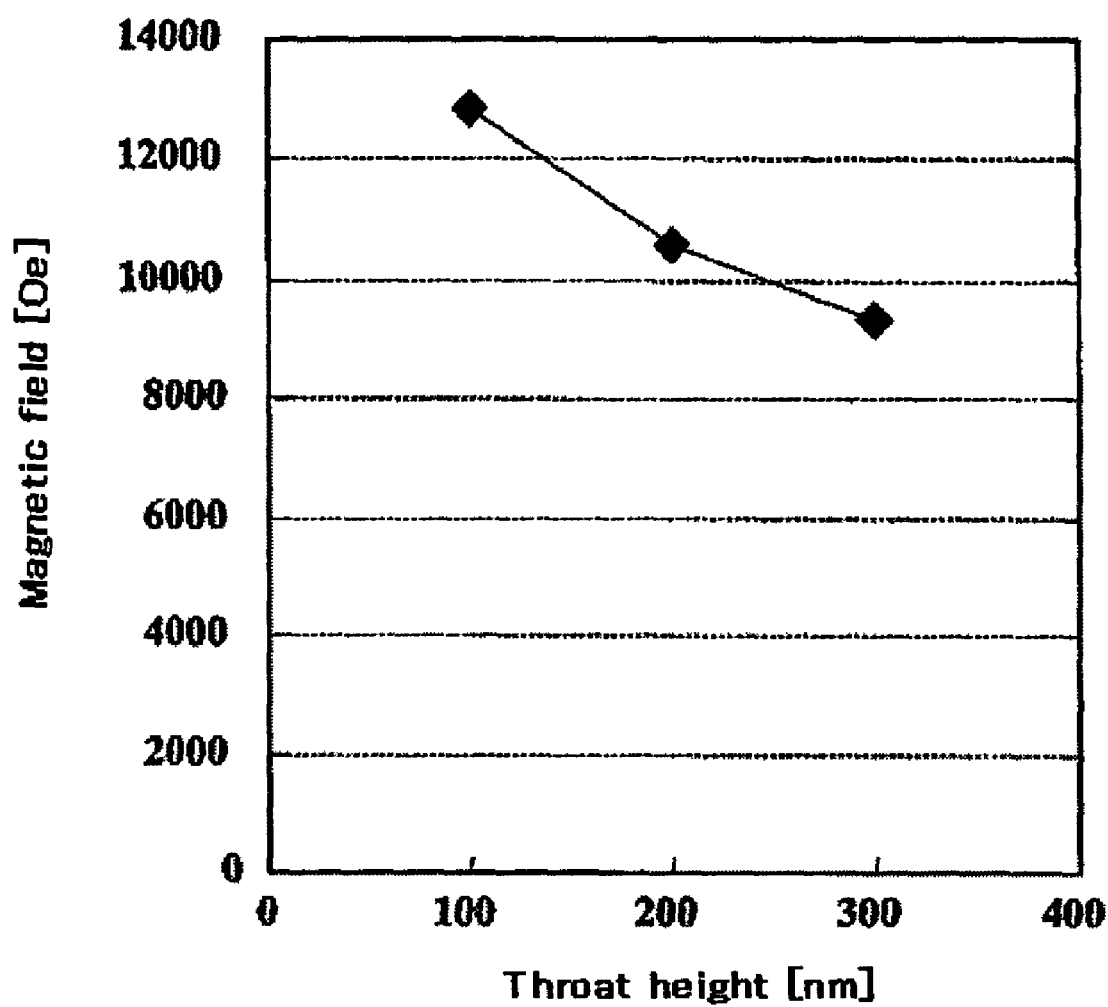
FIG. 1 shows the relationship between the magnetic field of a perpendicular recording head and the throat height.

Next, embodiments of the present invention will be described referring to the accompanying drawings. To facilitate understanding, like functional elements are designated by like reference numerals in the following drawings.

Figure 2:
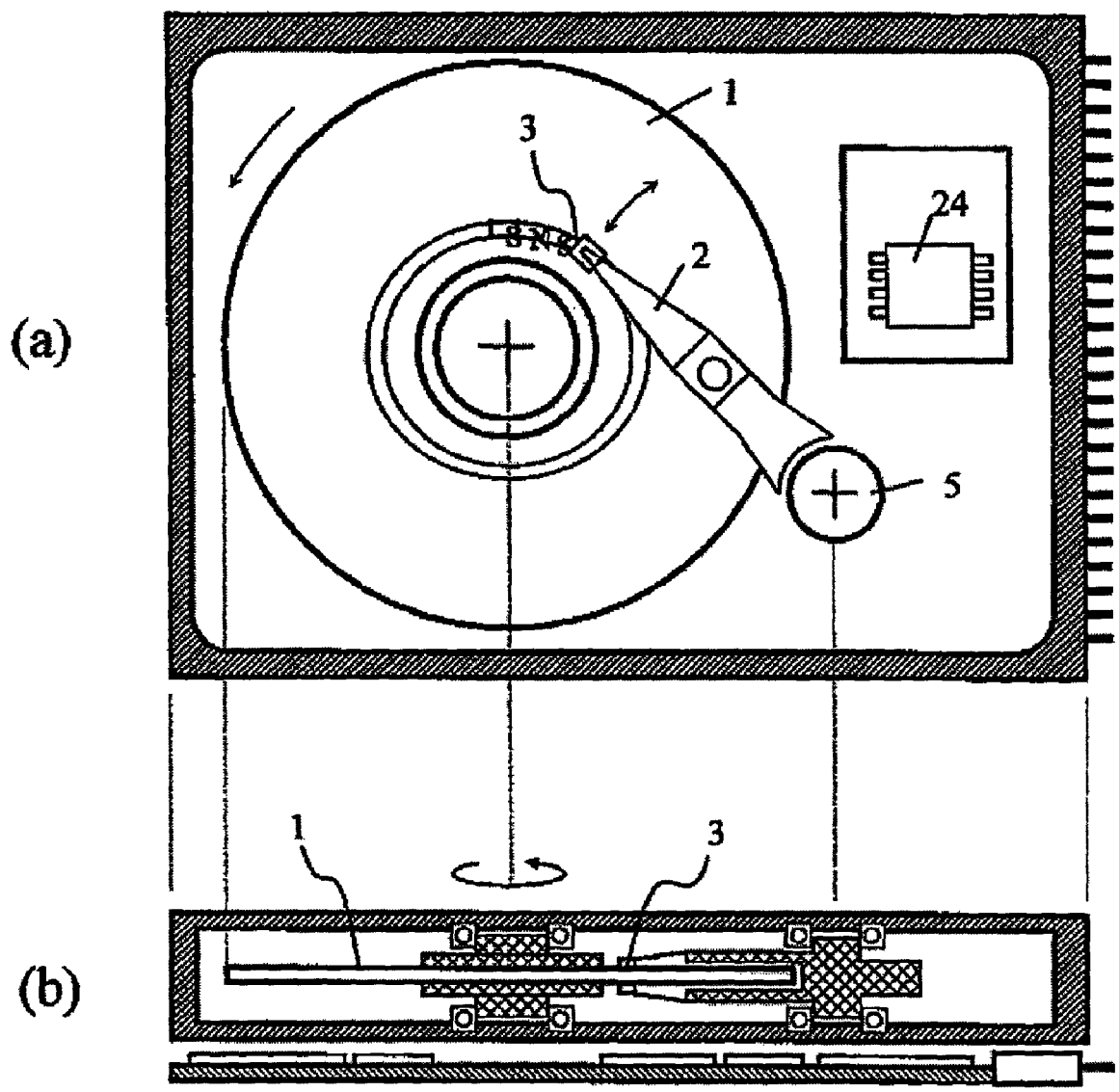
FIG. 2 is a schematic conceptual diagram of a magnetic write/read apparatus.

FIG. 2 is a conceptual diagram of a magnetic write/read apparatus. FIG. 2($a$) is a plan view and FIG. 2($b$) is a sectional view. In this magnetic read/write apparatus, a magnetic head 3 fixed to the tip of an arm 2 records and reproduces magnetization signals on a magnetic disk 1 which is rotated by a motor. The arm 2 is driven in the disk radial direction by an actuator 5 so that it is positioned on a track for recording (writing) or reproduction (reading). A write signal for driving the magnetic head 3 or a read signal sent from the magnetic head is processed by a signal processing circuit 24.

Figure 3:
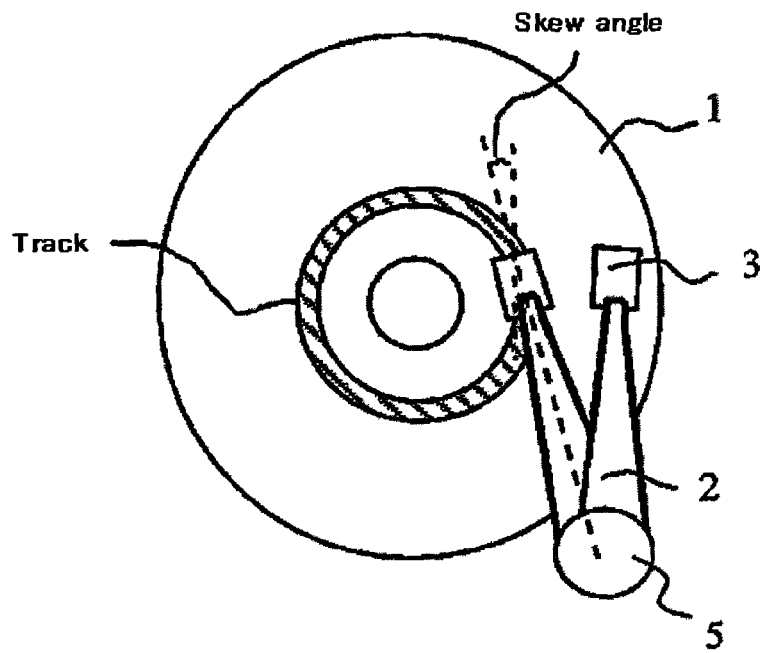
FIG. 3 is a schematic view showing operation of a magnetic write/read apparatus.

FIG. 3 shows how the magnetic head 3 moves over the magnetic disk 1 when the arm 2 is swung. As shown in the figure, a skew angle is generated. The skew angle range is ±20° or so.

Figure 4:
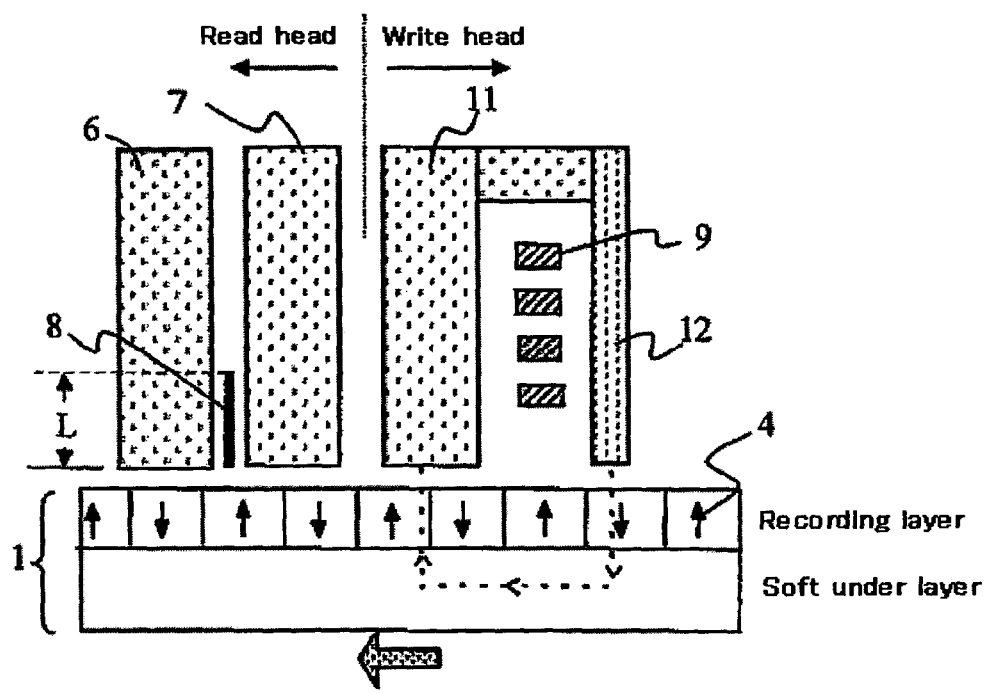
FIG. 4 schematically illustrates how perpendicular recording is done.

FIG. 4 outlines how perpendicular recording is carried out. The magnetic head consists of a write head and a read head. The write head is a head which generates a magnetic field for recording on a recording layer of the magnetic disk 1. It is a single pole type head which has a main pole 12, a return pole 11 and a thin film coil 9 interlinked with a magnetic circuit composed of the main pole 12 and return pole 11. The read head is a head which reads information written in the recording layer of the magnetic disk 1 and has a read element 8 such as a GMR element sandwiched between a pair of read shields 6 and 7. A magnetic field from the main pole 12 of the write head passes through the recording layer and soft under layer of the magnetic disk 1 and enters the return pole 11, making up a magnetic circuit to record a magnetization pattern 4 on the recording layer. At this time, in connection with the direction of the disk rotation, the shape of a portion of the main pole 12 which last leaves a certain spot on the magnetic disk 1, namely the shape of the top surface (trailing side) and side surface of the main pole largely influences the magnetization pattern.

Figure 5:
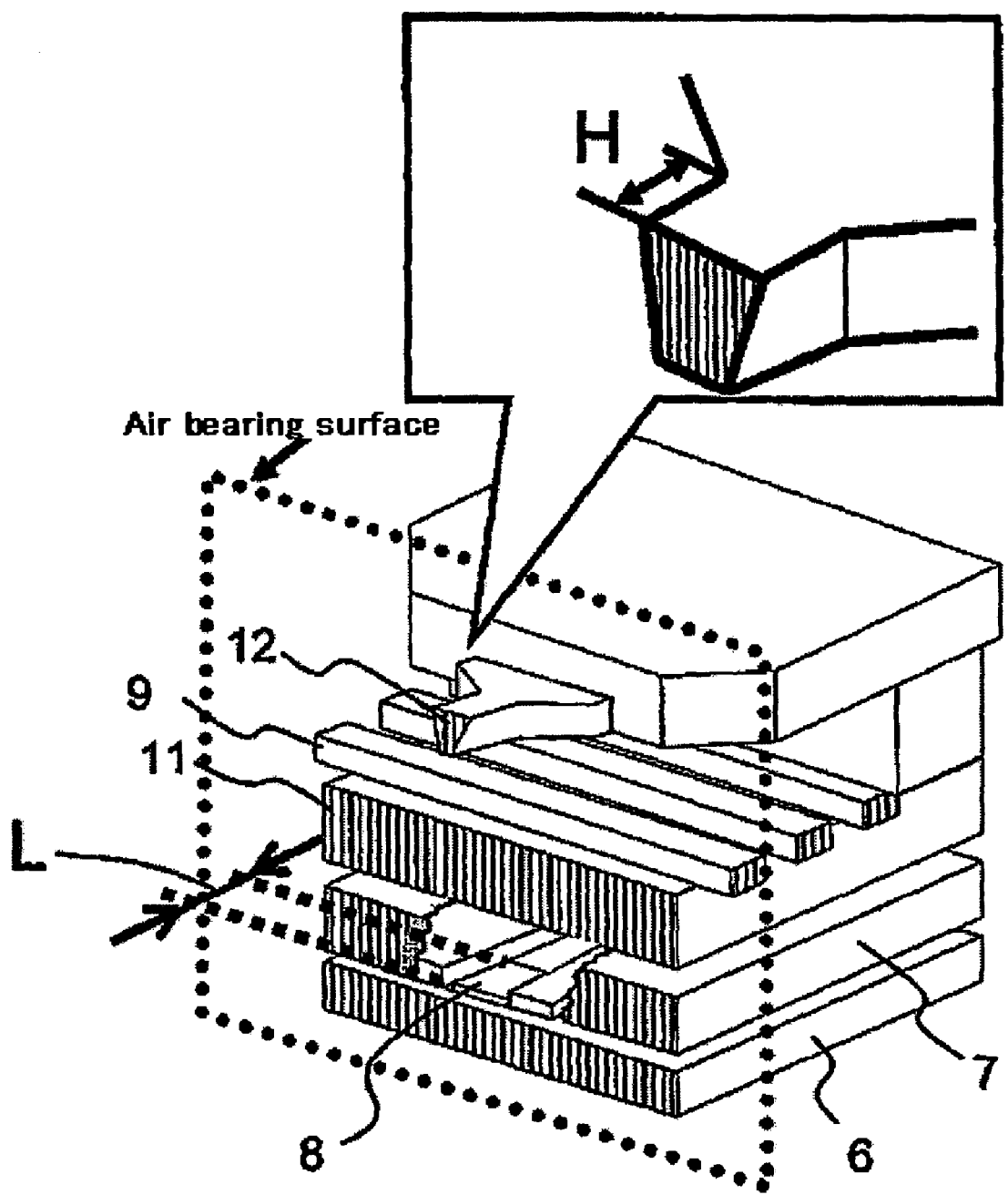
FIG. 5 is a schematic view showing a perpendicular recording magnetic head.
Figure 6:
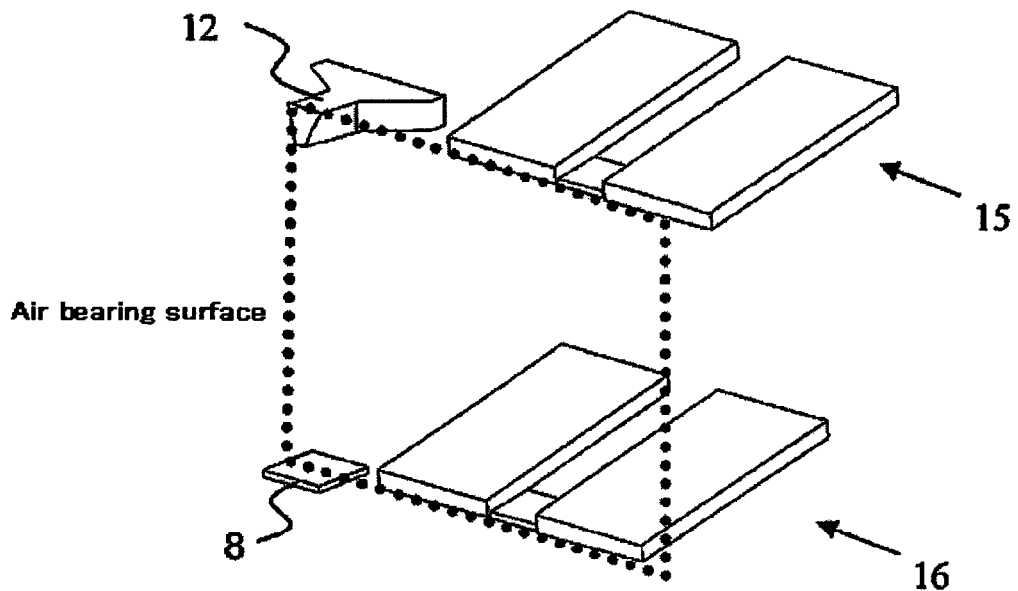
FIG. 6 is a schematic view showing that electro lapping guides are provided on both a write head and a read head.

FIG. 5 schematically illustrates a perpendicular recording head. In order to obtain good write/read characteristics, it is necessary to control throat height H (height from the air bearing surface of the main pole to the flare point) as shown and the element height of read head (height of the read element 8 from the air bearing surface) L as shown. FIG. 6 schematically shows that electro lapping guides (ELG) 15 and 16 for air bearing surface processing are located on both the write head and the read head.

Figure 7:
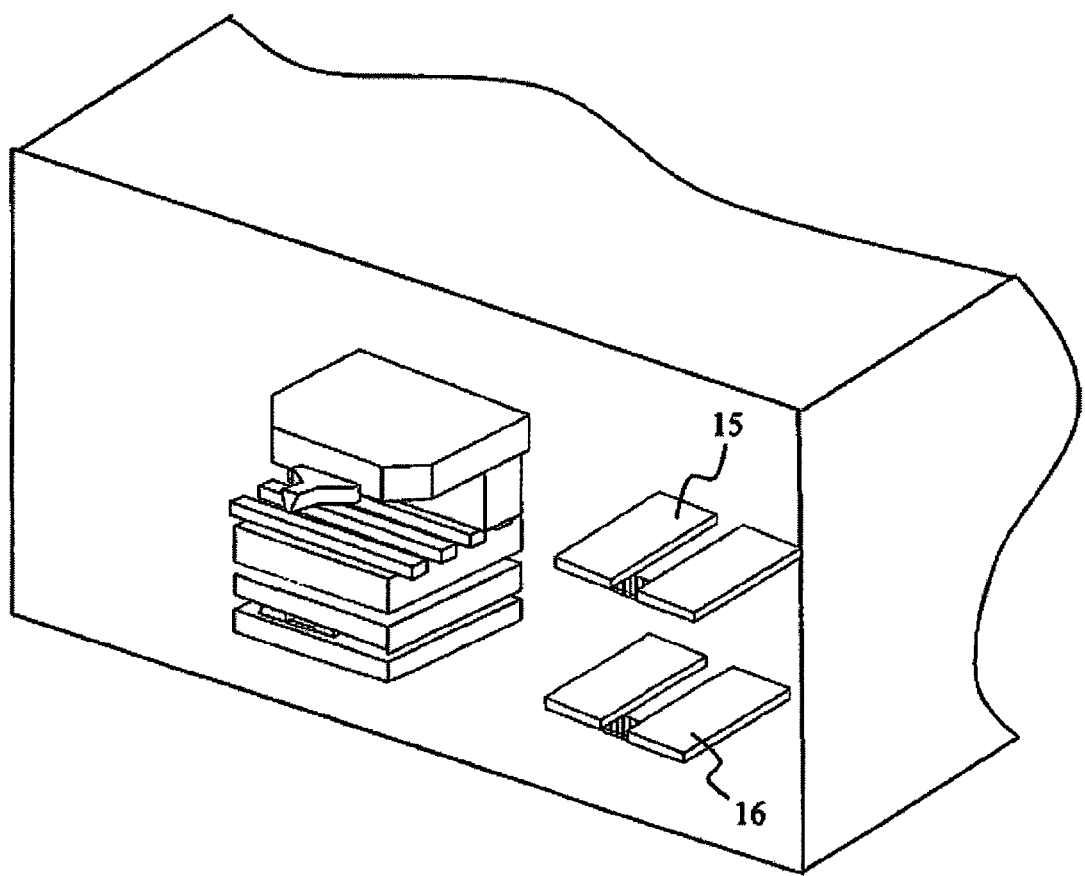
FIG. 7 is a schematic view of a head structure in which electro lapping guides are provided on both a write head and a read head according to an embodiment of the present invention.

FIG. 7 is a conceptual diagram showing an embodiment of the present invention. In this embodiment, there are an electro lapping guide (ELG) 15 for write head air bearing surface processing and an electro lapping guide (ELG) 16 for read head air bearing surface processing in each part which is to constitute a slider. While the throat height of write head is being monitored using the electro lapping pattern for write head air bearing surface processing, air bearing surface processing is carried out. In this process, both throat height H of write head and read head sensor height L can be controlled by monitoring the electro lapping guide 16 for read head air bearing surface processing as well. Currently, the required throat height H is 300 nm or less and the required processing accuracy is ±50 nm or less. When ELGs are used, it is possible to perform processing with a processing accuracy of ±50 nm or less and control the processing accuracy of the throat height of write head.

Figure 8:
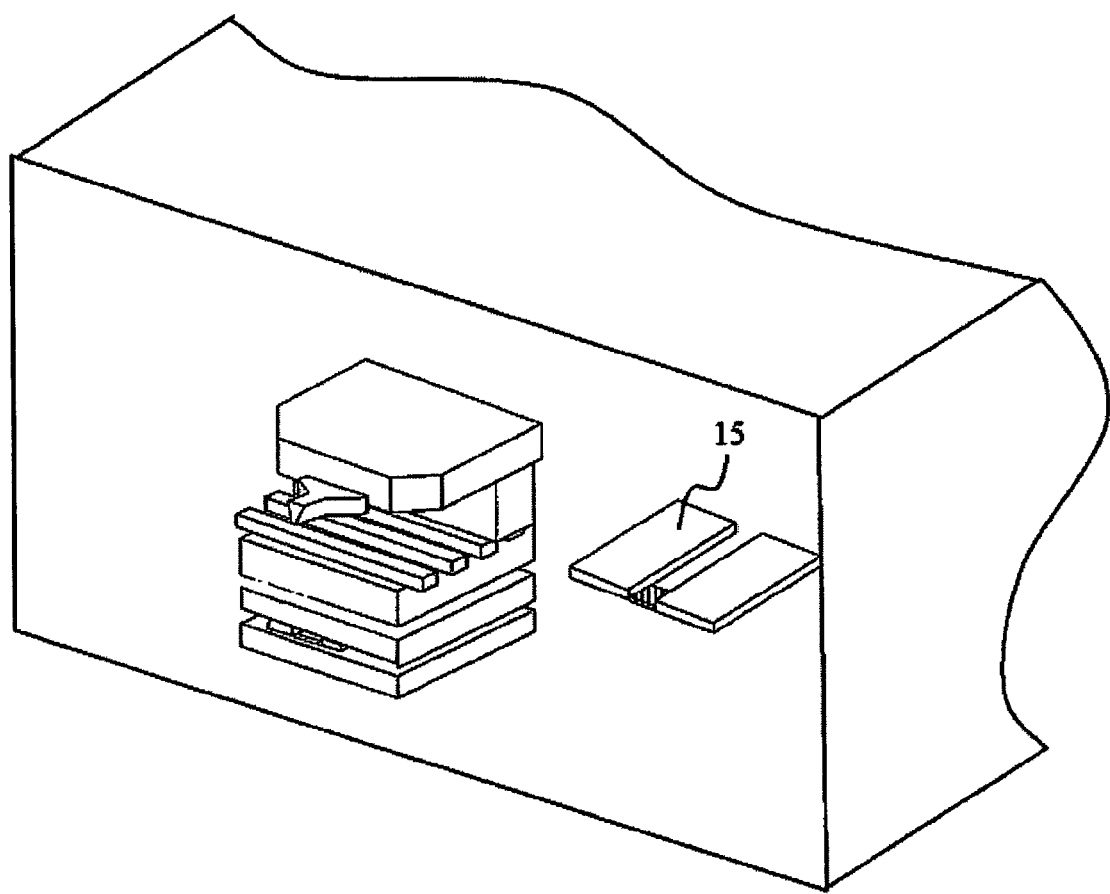
FIG. 8 is a schematic view of a head structure in which an electro lapping guide is provided on a write head according to another embodiment of the present invention.

FIG. 8 is a conceptual diagram showing another embodiment of the present invention. In this embodiment, only an electro lapping guide (ELG) 15 for write head air bearing surface processing is provided in each part which is to constitute a slider. For the read head, the read head sensor film itself is used as an electro lapping guide for air bearing surface processing.

Figure 9:
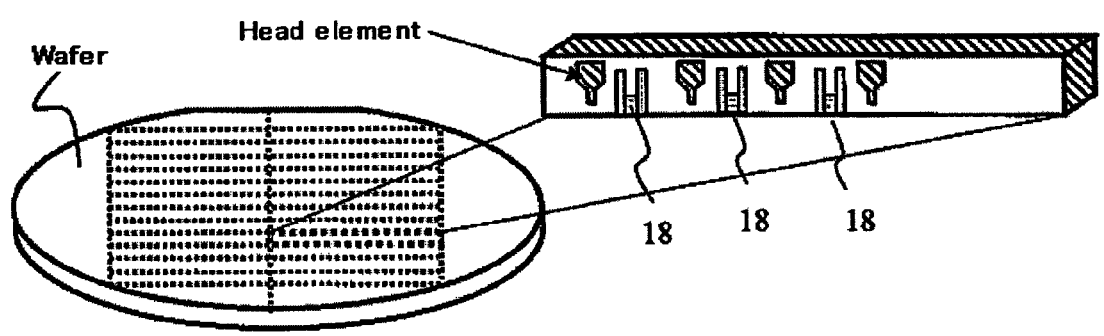
FIG. 9 is a schematic view showing a bar which has electro lapping guides for write heads according to another embodiment of the present invention.

FIG. 9 is a conceptual diagram showing another embodiment of the present invention. In this embodiment, an electro lapping guide 18 for write head air bearing surface processing is located between heads and air bearing surface processing is done on a bar. All electro lapping guides 18 are used for write heads and processing is done so as to optimize the throat height of write head; and read heads are selected by measurement of transfer curves after conversion into sliders. Alternatively, all electro lapping guides are used for write heads and for read head processing, using read heads themselves instead of electro lapping guides for air bearing surface processing, processing is done so as to optimize element height (sensor height) L of read head and throat height H of write head.

Figure 10:
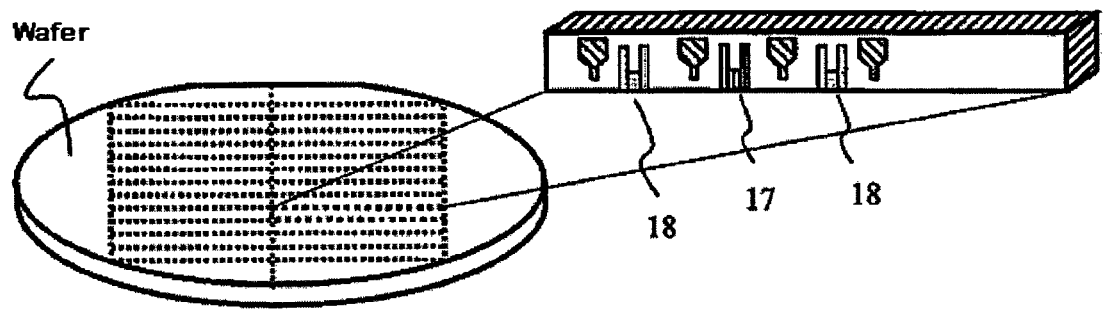
FIG. 10 is a schematic view of a bar which has electro lapping guides for write heads and electro lapping guides for read heads according to another embodiment of the present invention.

FIG. 10 is a conceptual diagram showing another example of electro lapping guide arrangement according to the present invention. In this embodiment, electro lapping guides 18 for write heads and electro lapping guides 17 for read heads are located alternately and air bearing surface processing is done on a bar. Here, the electro lapping guides are used to optimize element height L of read head and throat height H of write head.

Figure 11:
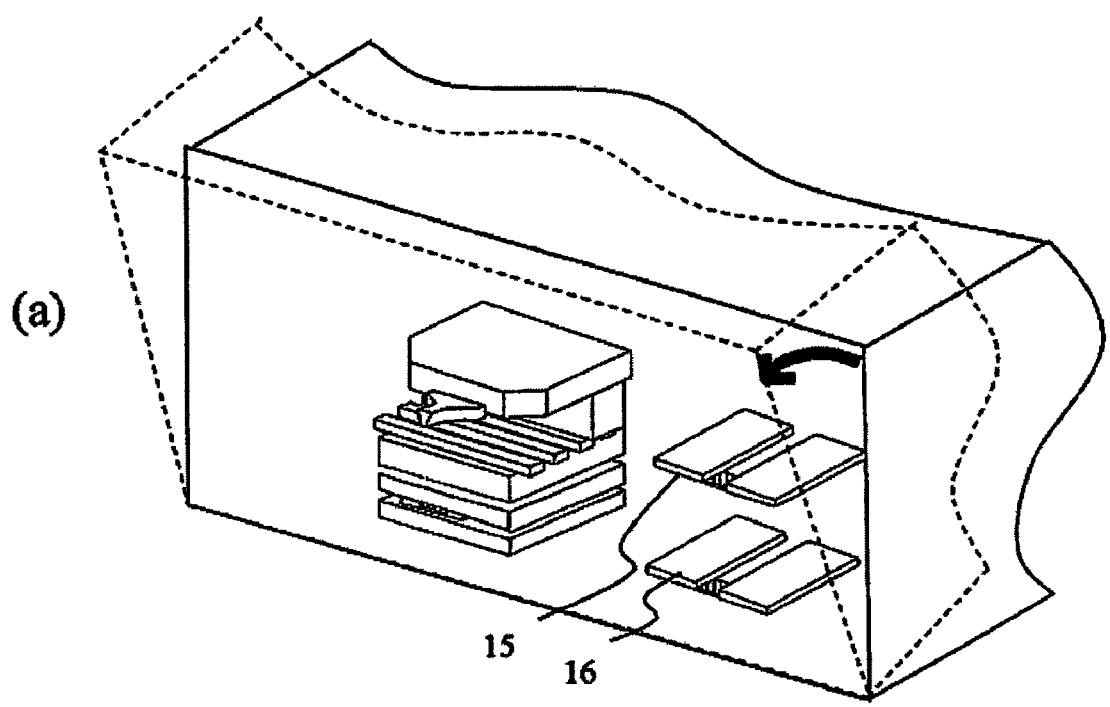
FIG. 11 is a schematic view showing how air bearing surface processing is done with an electro lapping guide for a write head and an electro lapping guide for a read head.
Figure 11:
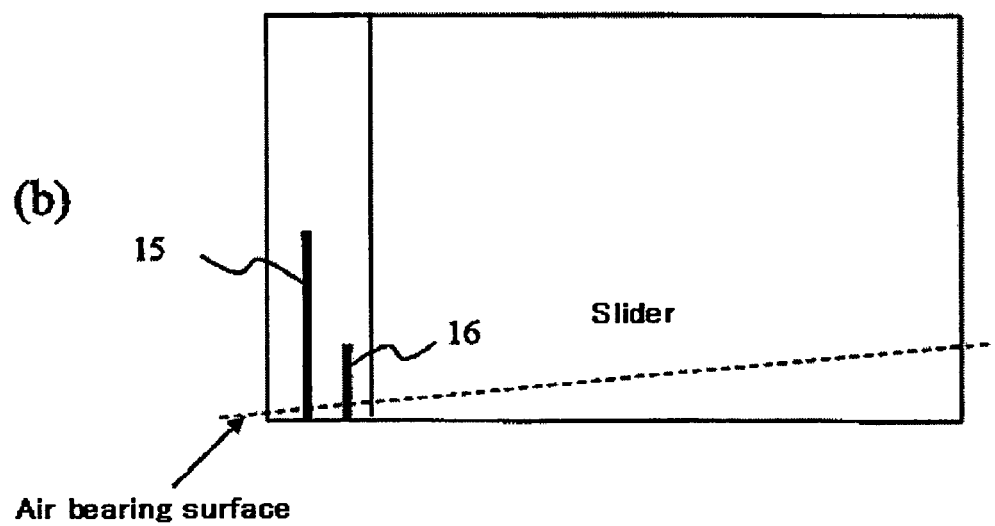

FIG. 11 is a conceptual diagram showing how air bearing surface processing is done using an electro lapping guide for write head air bearing surface processing and an electro lapping guide for read head air bearing surface processing. FIG. 11(*a*) is a perspective view and FIG. 11(*b*) is a sectional view. In the course of lapping the head air bearing surface, the resistance of the electro lapping guide for the write head and the resistance of that for the read head are checked. If it is found that the throat height of write head is larger than the read head sensor height, the slider is tilted as shown by arrow in FIG. 11(*a*) in a way to decrease the throat height of write head. Processing is controlled in this way so as to attain the desired values of both the read head sensor height and the throat height of write head. However, even when no electro lapping guide for air bearing surface processing is provided for the read head and the read head sensor element itself is used as an electro lapping guide, processing can be done similarly. If that is the case, the sensor height is known by measuring the sensor element resistance.

In making an electro lapping guide (ELG), photolithography for an electro lapping guide must be done in a target process (main pole photolithography process in the case of the write head). More specifically, the electro lapping guide for air bearing surface processing with the same pattern as that of the main pole itself must be placed on a mask (or reticle) in which a main pole processing pattern is made. The thickness of the main pole film of the write head is in the range of 200-300 nm and thus the main pole film is thicker and lower in electric resistance than the GMR film of the read head (approx. 30 nm). For this reason, when an electro lapping guide (ELG) is made, its resistance variation with its height variation due to lapping is small and the sensitivity in throat height control is low. A solution to this problem is to replace only the electro lapping guide film by a film whose resistance is equivalent to that of the film used for a read head electro lapping guide. As this type of film, NiFe, Ta, NiCr or Cr film may be used. This replacement improves the electro lapping guide accuracy and improves the throat height processing accuracy.

Furthermore, when a film whose resistance is equivalent to that of the film used for a read head electro lapping guide is used, namely a film which has the same processing characteristic as the film used for a read head electro lapping guide is used, the read head and the write head are equal in the relationship between the air bearing surface lapping amount and the rate of change in electro lapping guide resistance and controllability of processing work for the read head sensor height and the throat height of write head is improved.

Figures 1, 12:
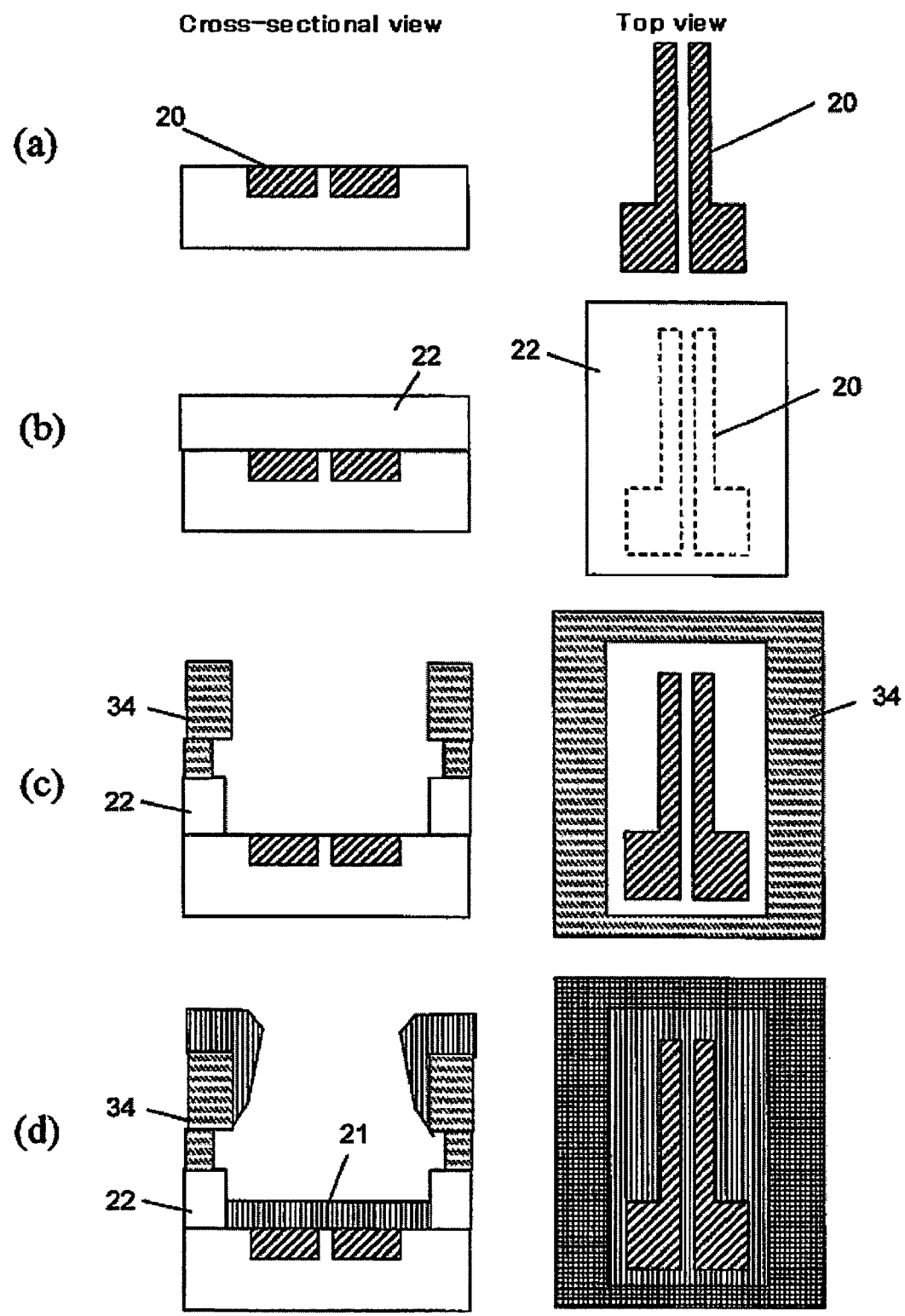

FIG. 12-1 and FIG. 12-2 illustrate the process of making an electro lapping guide for air bearing surface processing. (a) shows an electrode 20 for an electro lapping guide which has been made in advance. (b) shows a main pole film 22 made on the electrode pattern 20. (c) shows that a lift-off pattern 34 is made in a portion where an electro lapping guide is to be made and the main pole film is removed by milling. (d) shows that a NiFe film of 20 nm is made as an electro lapping guide film 21 by sputtering. Although the electrode 20 lies under the electro lapping guide film 21, it is shown here in order to facilitate understanding.

Next, (e) shows that the unwanted mask material and the NiFe film are removed by lift off and the main pole film 22 is partially replaced by the electro lapping guide film 21. This electro lapping guide film is not limited to NiFe film; it may be Ta, NiCr or Cr film. (f) shows that an electro lapping guide photoresist pattern 23 is made when the main pole pattern is made. Lastly, as shown in (g), ion milling etching is done using the photoresist pattern made at step (f) as a mask to make an electro lapping guide. When air bearing surface processing was performed using the electro lapping guide made by this method, a throat height processing accuracy of ±30 nm was achieved.

Figure 13:
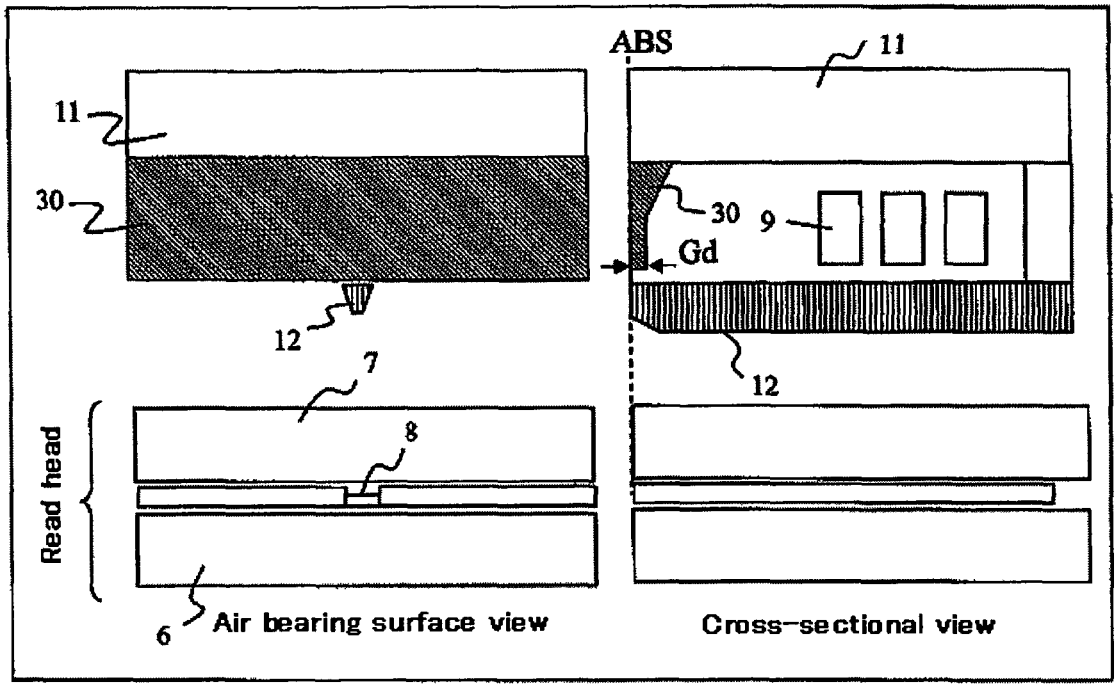
FIG. 13 is a schematic view of a head with a trailing shield.
Figure 14:
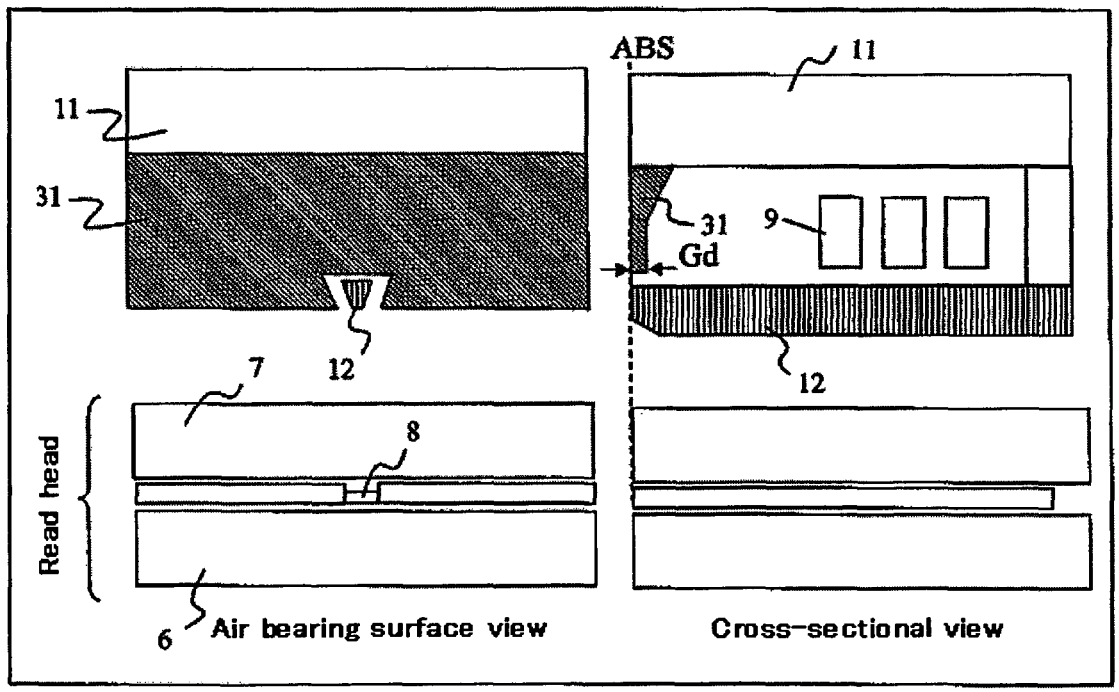
FIG. 14 is a schematic view of a head with a side shield.

FIGS. 13 and 14 show a head in which a trailing shield and a side shield are made in order to improve the magnetic field gradient and magnetic field distribution of the main pole. FIG. 13 shows an example of a head with a trailing shield 30 and FIG. 14 shows an example of a head with a side shield 31.

The thickness Gd of the trailing shield 30 and the side shield 31 from the air bearing surface is as important as throat height H. The reason is that if the thickness Gd of the trailing shield 30 and the side shield 31 from the air bearing surface is larger than throat height H, the field intensity which is applied from the main pole to the medium will decrease. On the other hand, if it is smaller, a sufficient effect of magnetic field gradient improvement or a sufficient effect of magnetic field distribution improvement will not be observed. Therefore, it is necessary to control the thickness Gd of the trailing shield 30 and the side shield 31 from the air bearing surface with high accuracy.

Hence, by providing an electro lapping guide for the trailing shield and the side shield and processing the air bearing surface, high accuracy in the thickness from the air bearing surface is achieved. At this time, the thickness (film thickness) of the trailing shield and the side shield in the wafer process is 1-2 μm and larger than the thickness (film thickness) of the main pole. Here, it may be not a milling process as a process of making a main pole or read head but a plating process. Again, in this case, when photolithography is done for the trailing shield and the side shield, a photoresist pattern for the electro lapping guide must be made at the same time.

Figures 1, 15:
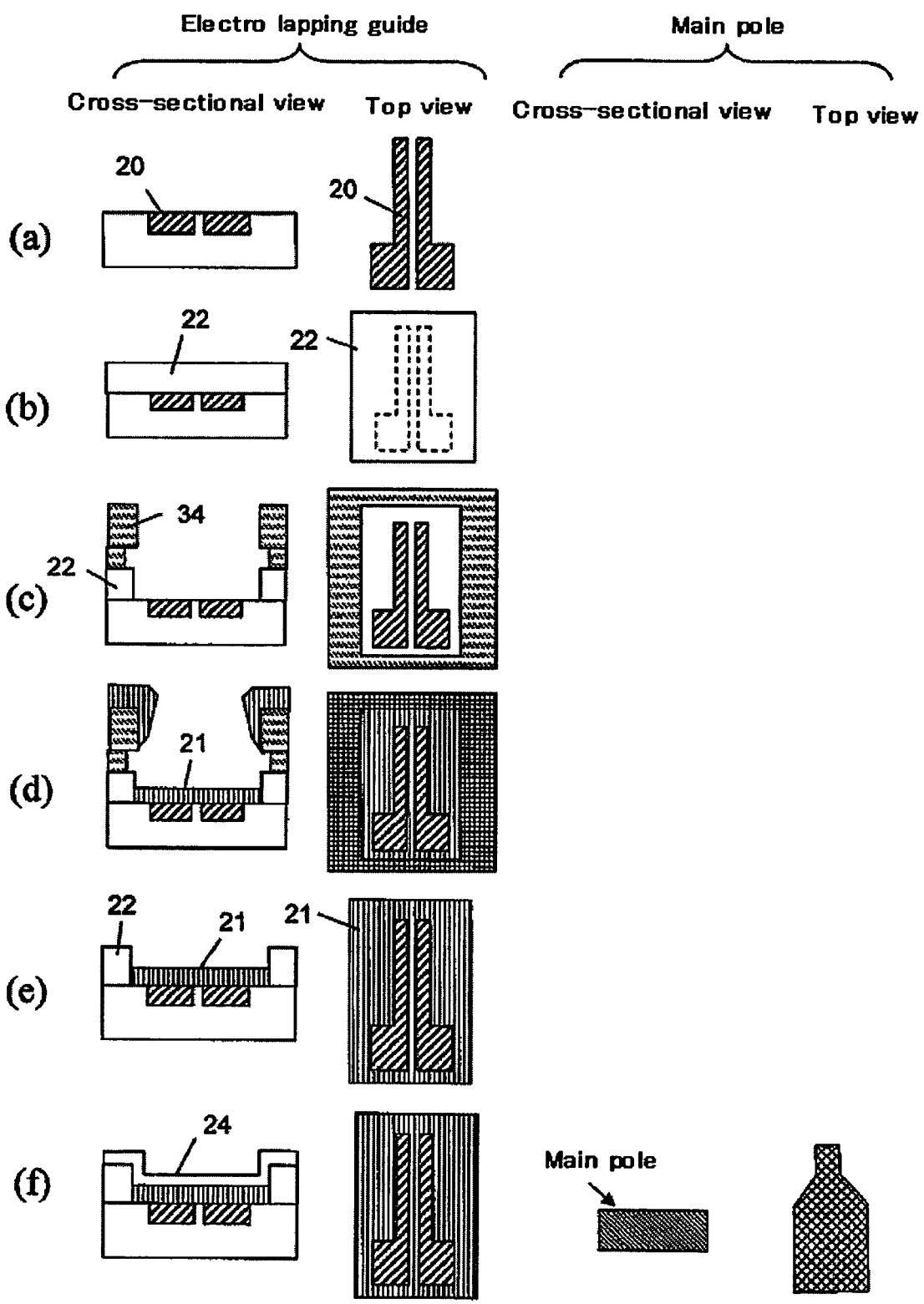
Figures 2, 15:
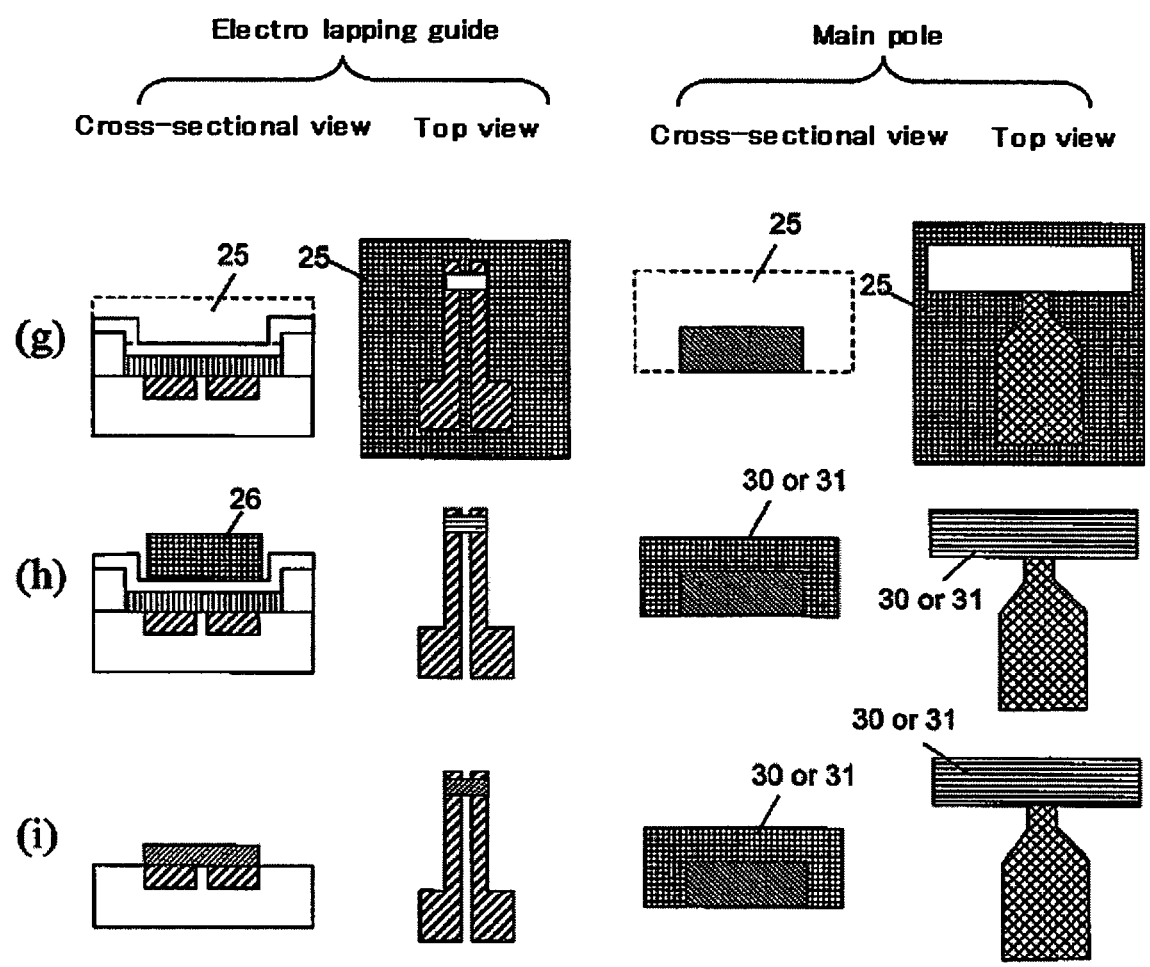

FIGS. 15-1 and 15-2 illustrate the process of making an electro lapping guide for air bearing surface processing for the trailing shield and side shield. The figures include top views of the main pole as well as sectional views and top views of the electro lapping guide.

First, (a) shows an electrode 20 made for an electro lapping guide. (b) shows a main pole film 22 made on the electrode pattern 20. (c) shows that a lift-off pattern 34 is made in a portion where an electro lapping guide is to be made and the main pole film is removed by milling. (d) shows that a NiFe film of 20 nm is made as an electro lapping guide film 21 by sputtering. Although the electrode 20 lies under the electro lapping guide film 21, it is shown here in order to facilitate understanding. (e) shows that the unwanted mask material and the NiFe film are removed by lift-off and the main pole film 22 is partially replaced by the electro lapping guide film 21. This electro lapping guide film is not limited to NiFe film; it may be Ta, NiCr or Cr film. Although the electrode 20 lies under the electro lapping guide film 21, it is shown here in order to facilitate understanding.

Next, (f) shows an insulating film 24 of alumina or silica laid over it. Although the electrode 20 lies under the electro lapping guide film 21, it is shown here in order to facilitate understanding. (g) shows that after a seed layer for plating is made on the insulating film 24, an electro lapping guide photoresist pattern 25 is made at the same time when a resist frame for plating is made for the trailing shield or side shield. Although the electrode 20 and the main pole are invisible due to the existence of the photoresist pattern 25, they are shown here in order to facilitate understanding. At step (h), a plating pattern 26 is made on the electro lapping guide when plating is done on the trailing shield or side shield. Then, as shown in (i), after the photoresist pattern and the seed layer for plating are removed, a pattern is transferred to the insulating film 24, for example, by ion milling and the pattern is transferred to the electro lapping guide film 21 using it as a mask, for example, by ion milling to obtain an electro lapping guide for the trailing shield.

When air bearing surface processing was performed using the electro lapping guide for the trailing shield which was made by the above method, a processing accuracy of ±30 nm in the trailing shield thickness from the air bearing surface was achieved.

Figure 16:
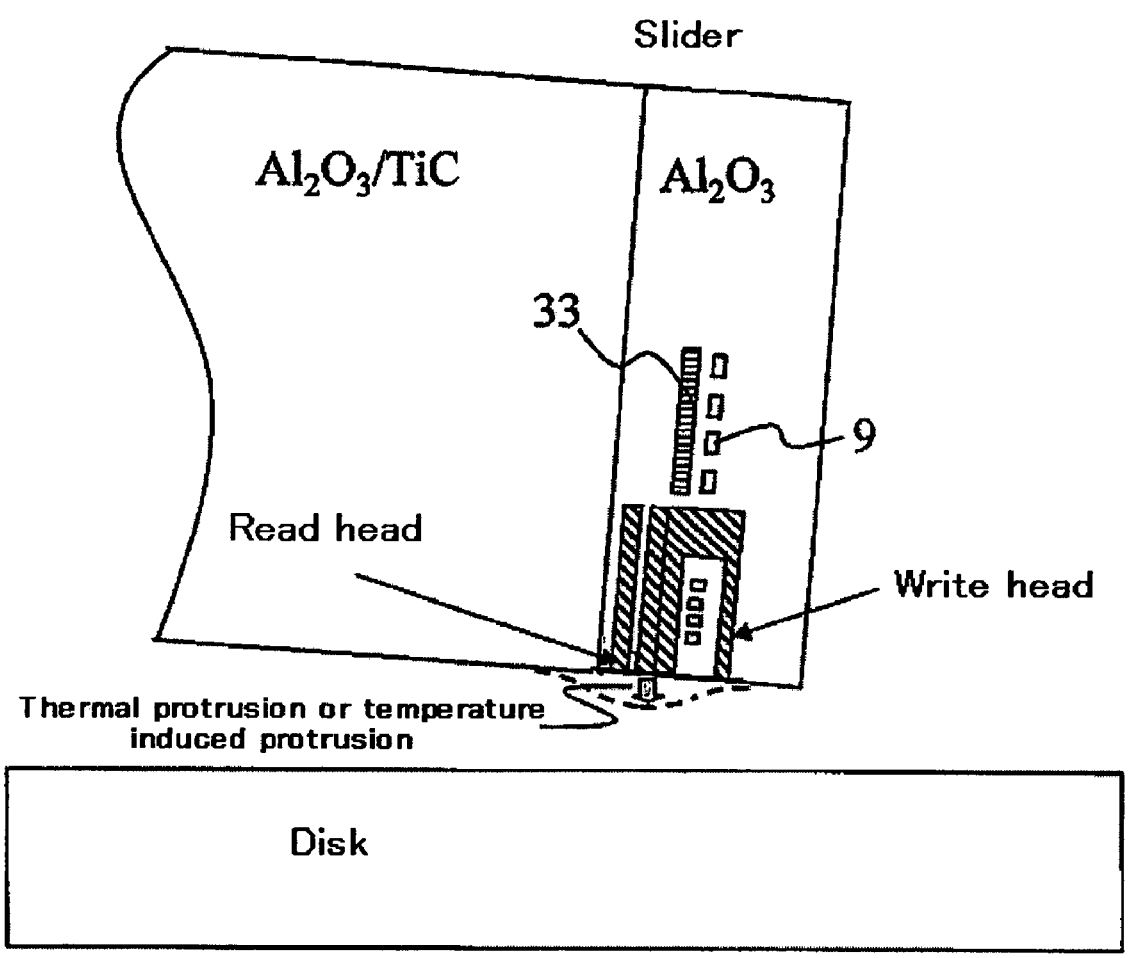
FIG. 16 is a schematic view of a slider with a heater for making some part of the air bearing surface (head part) protrude.

FIG. 16 shows an example of a magnetic head with a mechanism that the write head and the read head on the air bearing surface are made to protrude by heating with a heater 33 built in the slider so that the write head and the read head come closer to the magnetic disk surface. Even for this type of head, it is also possible to control the throat height according to the present invention.

The use of this perpendicular recording magnetic head makes it possible to improve the track density and the linear density and produce a magnetic write/read apparatus with an areal density of 200 Gbit/in$^2$.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic head configured to read and write information across a gap to a rotating disk-shaped storage medium, the magnetic head comprising:
   a read head with a magnetoresistive film and a write head with a main pole, a return pole and a shield made in the vicinity of said main pole, wherein the read head is separate from the write head; and
   an electro lapping guide disposed substantially in line with said main pole of said write head in an expected track width direction for air bearing surface processing for said write head which is used to control the thickness of said shield from an air bearing surface of the magnetic head, and wherein the electro lapping guide is disposed such that said read head and said write head are both on a same side of the electro lapping guide.

2. The magnetic head according to claim 1, wherein one surface of said main pole in a film thickness direction thereof is almost flush with one surface of said electro lapping guide for air bearing surface processing.

3. The magnetic head according to claim 1, wherein a film thickness of said electro lapping guide for air bearing surface processing is smaller than a film thickness of said main pole.

4. The magnetic head according to claim 1, further comprising an electro lapping guide for air bearing surface processing for said read head which is used to control the height of said magnetoresistive film from the air bearing surface.

5. The magnetic head according to claim 4, wherein the electro lapping guide for air bearing surface processing for said write head and the electro lapping guide for air bearing surface processing for said read head are made of materials at least substantially equal in film electric resistance.

6. The magnetic head according to claim 4, wherein the electro lapping guide for air bearing surface processing for said write head and the electro lapping guide for air bearing surface processing for said read head are made of materials at least substantially equal in processing characteristics.

7. The magnetic head according to claim 1, wherein the shield comprises a trailing shield.

8. The magnetic head according to claim 1, wherein the shield comprises a side shield.

* * * * *